D. H. CHAMBERLAIN.
STEERING APPARATUS.
No. 17,724.                  Patented July 7, 1857.
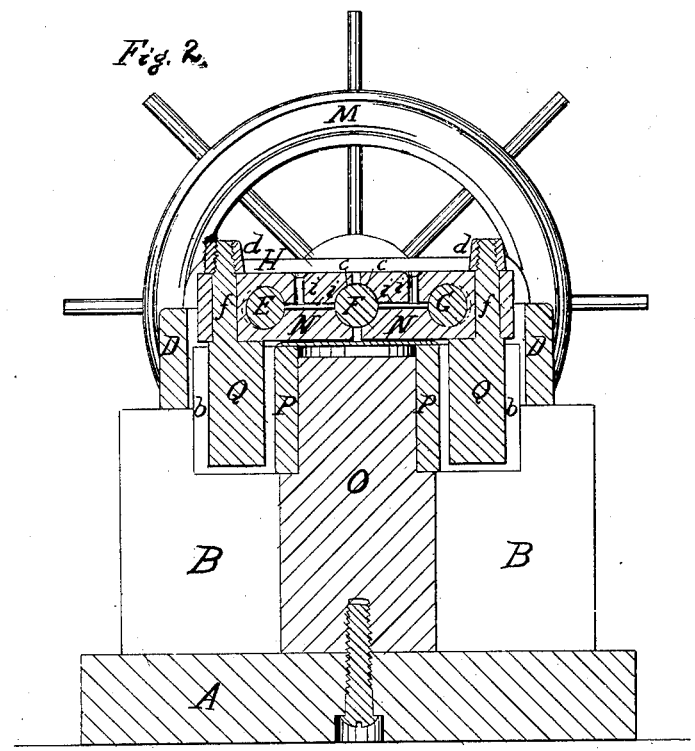
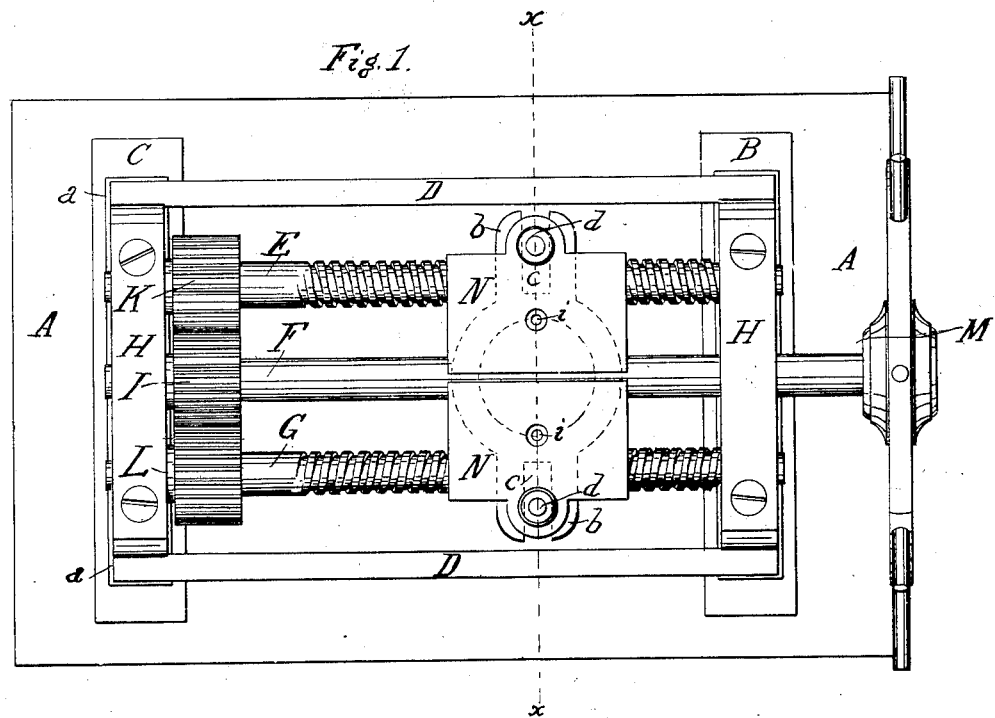

UNITED STATES PATENT OFFICE.

DEXTER H. CHAMBERLAIN, OF WEST ROXBURY, MASSACHUSETTS.

STEERING APPARATUS.

Specification of Letters Patent No. 17,724, dated July 7, 1857.

*To all whom it may concern:*

Be it known that I, DEXTER H. CHAMBERLAIN, of West Roxbury, in the county of Norfolk and State of Massachusetts, have invented certain Improvements in Steering Apparatus for Vessels, of which the following is a full, clear, and exact description, reference being had to the accompanying drawings, making part of this specification, in which—

Figure 1, is a plan. Fig. 2, a transverse vertical section on the line $x, x$, of Fig. 1.

The object of my present invention is to make a cheap, durable, and compact steering apparatus.

In the drawings, A represents the deck of a vessel from which rise two heavy stanchions, B, and C. These serve as supports for a solid cast iron rectangular frame, D, the ends of which let into and are secured to the stanchions in such a manner that a packing of oakum or other suitable material may be placed around the ends of the frame D, as at $a$, that its contact with the stanchions may not be too rigid, and may allow a little for the spring and play of the rudder post.

The frame D, serves as a bearing for three shafts, E, F, and G, which extend lengthwise of the frame and parallel to each other; they have their bearings in the ends of the frame D, and are held in place by a cap H, at each end screwed down to the frame D. The shaft F, carries at one end a pinion I, which engages with the gears K on the shaft E, and L, on the shaft G; this shaft F, is extended at its other end beyond the frame D, and carries the steering wheel M, of the ordinary construction. The shafts E and G, have cut on them single threaded screws, the threads being cut one in the opposite direction from the other, or one to the right and the other to the left hand. Each of the screw shafts E and G, carries a heavy screw nut N, one edge of which is grooved as at $c$, Fig. 2, and slides in contact with the middle shaft F, which thus becomes a guide bar for both nuts. On the top of the rudder head O, is secured a cap P, having two projecting arms $b$, (seen dotted in Fig. 1 and in section in Fig. 2,) each of these arms is furnished with a slit $c$, in which slides a feather or spline Q secured to the nuts N, in the following manner: To the upper part of each feather Q, is attached a round arm $f$, which passes up through the nut N, above it near its outer edge, turning freely in the nut and being secured thereto by a small nut $d$, screwed onto the end of the arm. Thus as the nuts N, are moved in opposite directions by the revolution of the screw shafts E and G, the cap P, is rotated on an axis passing longitudinally through the middle of the rudder post, the feathers Q slide in the slits $c$, their arms $f$, turning in their bearings in the nuts N, allows the feathers to maintain a position radial to the circle of revolution of the cap P.

The nuts N, are furnished with oil channels $i$, through which the shaft F, and the screws E, and G, may be oiled.

I will here mention some of the advantages of this construction of steering apparatus; it is simple, durable, and compact. The frame D, may be cast in one piece which renders it easy to attach or remove the whole apparatus and to adjust it to the rake of the rudder post, and if from the wear of the pintles or warping of the rudder post it becomes necessary to alter the set of the apparatus, the frame D, being in one piece can be easily adjusted. The screws E and G, running in large solid nuts are not liable to strip and wear as do those made with a right and left hand screw on the same shaft engaging with a sectional nut. The nuts N, sliding in contact with the middle shaft F, obviates the necessity of any supplementary guide rods for the nuts to run on, or other apparatus to guide and steady the nuts. It can be constructed at a less cost than any other equally efficient steering apparatus with which I am acquainted.

What I claim as my invention, and desire to secure by Letters Patent, is—

The nuts N, with their vibrating feathers Q, in combination with the parallel shafts E, F, and G, when the said nuts rest against and are guirded by the middle shaft F, as set forth.

D. H. CHAMBERLAIN.

Witnesses:
 THOS. R. ROACH,
 P. E. TESCHEMACHER.